March 8, 1966     P. H. BOUCHERON, JR     3,239,799
SONAR DIRECTIONAL BEAM FOCUSING SYSTEM
Filed Nov. 27, 1961
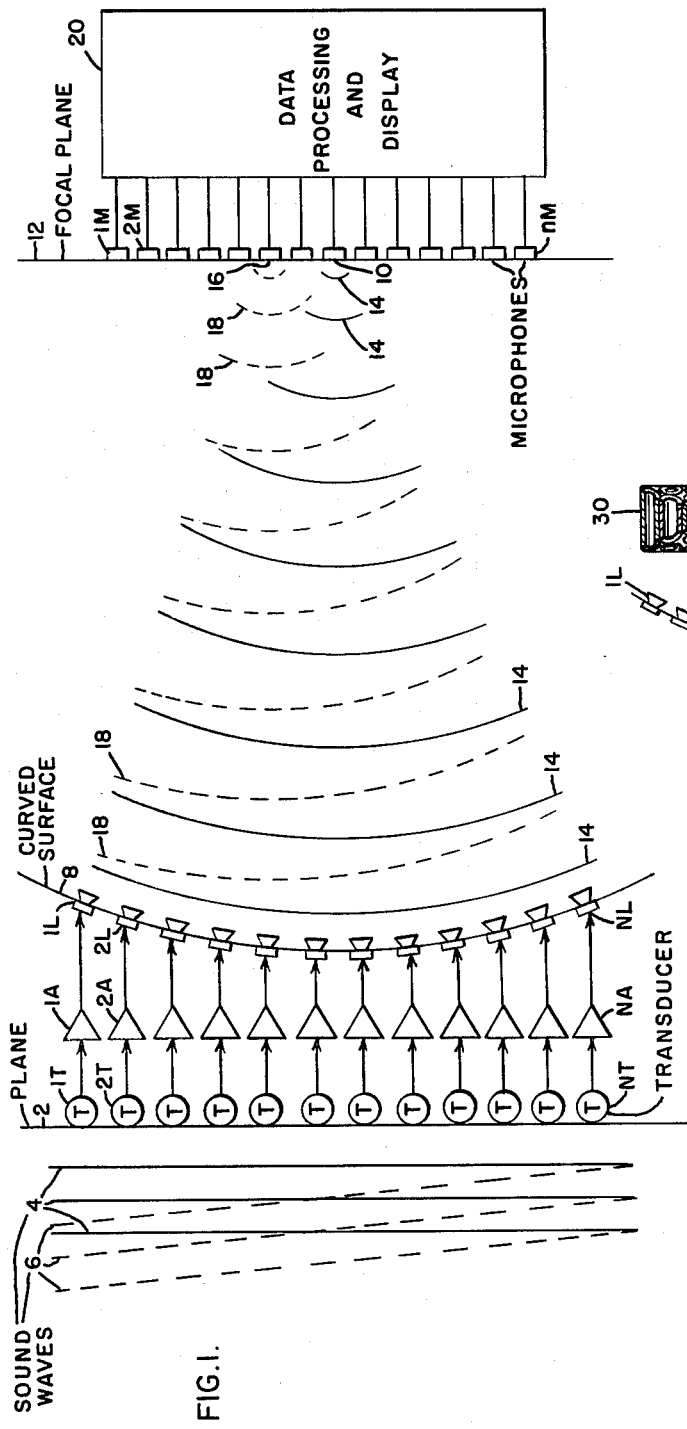
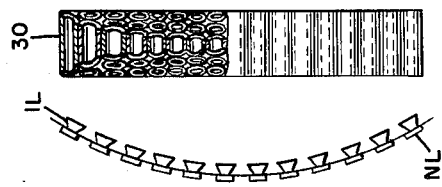
FIG.2.
INVENTOR:
PIERRE H. BOUCHERON, JR.
BY Delbert P. Warner
HIS ATTORNEY.

United States Patent Office 3,239,799
Patented Mar. 8, 1966

3,239,799
SONAR DIRECTIONAL BEAM FOCUSING
SYSTEM
Pierre H. Boucheron, Jr., North Syracuse, N.Y., assignor to General Electric Company, a corporation of New York
Filed Nov. 27, 1961, Ser. No. 155,009
7 Claims. (Cl. 340—6)

The present invention relates to sonar receiving devices and in particular it relates to mechanically fixed sensor arrays coupled to processing means, where the sensor arrays receive sound waves simultaneously from a number of sources located in various directions and at various distances, and the processing means convert the signals from said sensor arrays to focused images made up of sound waves.

It has been shown in the prior art devices that a sensor array may be mounted on gimbals which can be turned to cause the sensor array to face in the direction from which energy is coming. However, the large size of such an array as applied to sonar devices is likely to be such that it is difficult to use a movable mounting. This limitation is fundamental, since large array size is needed to make it possible to make accurate determinations of the direction from which the signal energy comes. The accuracy of direction determination depends on the effective aperture of the sensor—the greater the diameter of the sensor the greater the directional accuracy. Even with radar waves the apertures may become unmanageable in mechanically steerable antennas, but with the frequencies employed in sonar, the requirement that the aperture be many times the wave length of the energy (or signal) received in order to secure the desired directional accuracy, results in arrays which are huge—sometimes with dimensions measured in hundreds or thousands of feet.

A technique used in the prior art to eliminate the need for steerable antennas is that of mounting the sensor array in a fixed position and shifting the direction to which the array is sensitive by varying the electrical phase relationship between the individual sensors of the array. This is a workable technique, but it has serious practical limitations. In the first place, electrical phase shifters are difficult to implement, even though completely practical, at the audio frequencies involved. An even more important consideration is the fact that the information gathering capability of a sonar set is distinctly limited by the speed of propagation of energy (sound) through the media (water). Consequently, it may be several minutes between the time a signal is sent out by the sonar sender and the time that the reflection is received back from an object at a distant range. This, of course, means that if we were to adjust the phase shift network of a sonar sensor array to study the energy return from one position at a time, the total time required to survey a volume would be prohibitive.

The technique of fixed arrays of the last paragraph may be employed by varying the phase shift network of the arrays very rapidly. In this way the effective beam of the array can scan its entire angle of coverage in a very small increment of the energy propagation time. The trouble with this approach is that it is essentially a sampling system and the energy available from any point in the space under surveillance would be drastically reduced and greatly lower the chances of detecting the targets.

Still another approach employing fixed arrays and a varying phase shift network is that in which the matrix of phase shifters is set up such that all possible beam positions of the sensor array are considered simultaneouly. This is the most favored of all the prior art solutions to the problem of sensing sonar signals. It is a good solution, however, it has limitations, the most serious of which is the requirement for excessively large amounts of hardware.

It is, therefore, a primary object of this invention to provide improved non-rotating means for receiving, processing, focusing, and using sonar beams which scan a volume of space.

It is a further object of this invention to provide means for receiving sound waves simultaneously at a variety of angles of incidence, i.e. from a number of objects having different positions in space (or azimuths, elevations, and ranges), and converting them into focused images.

It is yet another object of this invention to provide means for directively receiving sound waves and focusing them.

It is still another object of this invention to provide means for receiving sound waves and focusing them in a manner analogous to the way in which light is received and focused.

Briefly stated, in accordance with one aspect of the invention a group of hydrophone sensors are arrayed in a plane or a selected curved surface, where each of the hydrophone sensors is sensitive to sound from any direction of interest. Each of the hydrophones is coupled through an amplifier to a loudspeaker, which is one of a number of loudspeakers arrayed in a three-dimensional curve with their speaker elements located in the curve and directed toward the focal point of the curve. The loudspeakers reproduce the elements of the sound waves received by each of the individual hydrophones, maintaining the phase relationships that the individual sound wave components had when received by the respective hydrophones and reconstituting the waves with the difference that the waves are now directed toward points on a focal plane or other surface. This enables the system to focus wave fronts incident parallel to the plane of the hydrophones directly on the focal point of the curve through the loudspeakers and to focus wave fronts incident at acute angles to the plane of the hydrophones on other focal points located elsewhere in the focal plane. In this way the invention makes it possible to focus sound waves to form an image on a focal plane, or other surface, in a manner analogous to the way in which light is focused by a lens.

The features of this invention which are believed to be novel are set forth with particularity in the appended claims. The invention itself, however, both as to its organization and its method of operation, together with further objects and advantages thereof, may best be understood by reference to the following description taken in connection with the accompany drawings, in which—

FIG. 1 is a schematic diagram illustrating a preferred embodiment of the invention, and FIG. 2 is a sectional view of an additional feature of the invention.

Turning now to the embodiment of the invention illustrated in FIG. 1, we find an array of transducer T which are labeled 1T, 2T . . . NT, where N is the total number of transducers. The transducers 1T-NT are shown in FIG. 1 to be arrayed beside a line where the line represents the intersection between a plane 2 and the face of the paper. The transducers illustrated in FIG. 1 represent only one column or one row of a plurality of such rows and columns of transducers arrayed with their receiving elements located in the plane 2. It will be appreciated that a plane has been selected for purposes of illustration, but that some other curve may serve as well or better. To the left of the plane 2 in FIG. 1 is shown a plurality of straight lines 4 which are parallel to the intersection of the paper and the plane. These lines represent the wave front of a sound wave which is incident parallel to the plane in which the transducers are located. This means that the objects from which the wave front 4 originated are located, in the ideal case, somewhere along a line perpendicular to the plane 2 and running through the center of the transducer array. Another plurality of lines, designated by the dashed lines 6 are shown to the left of the plane 2 of FIG. 1 to represent the wave front of a sound wave which approaches the plane 2 from such an angle that the wave front will strike the transducer array at an acute angle.

The difference in the effect produced by wave fronts 4 and 6 will now be made apparent. All parts of the wave front 4 will strike the transducers at the same time, assuming of course that the transducers are all located with their receiving elements in the same plane 2 and that the approaching wave front is substantially a plane surface. Neither of these conditions may be realized completely in practice, but they both may be realized to a sufficient degree for the purposes of this invention. In some cases, the actual surface 2 may be curved for practical reasons, in which cases the accepted wave fronts will also be somewhat curved. The effect of having the face of the wave front 4 strike all the transducers simultaneously is to excite the transducers so that their outputs to the amplifiers 1A, 2A . . . NA will be substantially all in phase. The effect of a wave front such as 6, which strikes the plane 2 at an acute angle, is to produce signals in the transducers 1T–NT which vary in phase and are transmitted to the amplifiers where that phase difference will be amplified and transmitted to loudspeakers 1L to NL.

The loudspeakers 1L through NL are arrayed in such a way that their emitting elements are located substantially in the curved surface 8, which has a focal point at 10. It will be appreciated that this curved surface is three-dimensional and may be a portion of a sphere, of a paraboloid, or other solid curve having a focal center at a point such as 10. In the operation of the invention the wave fronts will be received by the transducers T, which may be hydrophones, and be converted into electrical signals which will then be received and amplified by the amplifiers 1A through NA. The amplifiers will transmit the signals to the loudspeakers which in turn will reproduce the portion of the sound wave received by the corresponding transducer. The loudspeakers, however, are located with respect to the curved surface 8 in such a way that they will charge the direction of the portion of sound received by their corresponding transducers and tend to focus the sound in some point in the focal plane 12. It will be recognized, of course, that some other surface that a plane may be selected as the focusing surface and the invention is not limited to the use of a plane at surface 12.

In a situation in which an incident wave front is parallel to the plane 2, as wave 4 is shown to be, the output of the loudspeakers will be directed toward the focal point 10 of the surface 12. The lines 14 are drawn to indicate the general way in which the wave fronts will move to focus at the focal point 10. In cases where the wave front approaches the transducers at an angle, as for example the wave front 6, the signals received by the transducers will be out of phase and the out of phase signals will be translated through the amplifiers to the corresponding loudspeakers so that the new wave front formed by the loudspeakers will have a different focal point such as 16. The new wave front might be formed by the loudspeakers from an initial wave front such as 6 along dashed lines 18, where the dashed lines are intended merely to show the general way in which the waves will coverge on some focal point 16.

The wave fronts focused at various focal points such as 10 and 16 represent all the energy, concentrated at a single point, which comes from an object or objects located in very narrow sectors extending out into space from the face of the transducers. In the case of a small target, or else one located at a great distance, the reflected sound may all be concentrated by this invention at a single focal point such as 10 or 16. In the case of a larger object, or a small object located near at hand, the energy reflected from various parts of the object may be concentrated by the invention on a broad focal point or on two or more focal points in the focal plane. In the latter case, a multi-element image of the object will actually be formed with the resolution of the image being dependent on the number of separate focal points which are distinguishable.

In order to effectively use the sound energy concentrated on the various focal points in the focal plane it is necessary to have a plurality of microphones or similar sound sensors which are designated in FIG. 1 as 1M through $n$M, where $n$ represents the total number of microphones used and may be a number much larger than the N desginating the number of transducers, amplifiers and loudspeakers. It will be appreciated that the number of microphones will determine the resolving power of the system to a very large degree, since there must be a separate microphone for each discrete resolvable beam position which it is desired to consider. In order to make use of the signals impinging upon the microphones, the electrical outputs of the microphones must be utilized in some sort of display device or other means of conveying information derived from sonar devices. Such data processing or display equipment may employ conventional equipment and therefore it is merely indicated by the block 20.

It was noted in an earlier paragraph that the transducers or hydrophones T might not always be arrayed in a perfect plane, and in fact this is not likely to be the case. This is a relatively simple condition to correct, since any misalignment may be compensated for by changes in the positions of the loudspeakers 1L–NL or by providing adjustable delay circuits in the amplifiers 1A–NA. It is anticipated also that some need for making such adjustments may be necessary when the invention is in operation with all the transducers under water and one or the other of them becomes misaligned due to vibration, collision or the like.

The focal plane 12, or other focusing surface, of FIG. 1 may be mounted on movable means, not shown, which can move the surface 12 to adjust the distance between the loudspeakers 1L–NL and the surface. In this way, it is possible to adjust the focus between the loudspeakers and the focusing surface in a manner analogous to the way in which an optical system is brought into clearer focus. Also, since the speed of propagation of energy in the acoustical portion of the system is relatively slow it is possible to move the focusing surface of the system in synchronism with the range propagation time over a fairly broad range to improve the focusing characteristics.

Some deterioration in the sharpness of focus has been determined as the subjects move off-axis. This condition appears to be analogous to spherical aberration as encountered in lens design and may be compensated for by use of a compound lens structure inserted between the loudspeakers 1L–NL and the focal point 10 as is illustrated in FIG. 2. As shown in FIG. 2, this lens structure consists of a honeycomb of tubes of varying length with the shortest tubes in the center and the longest ones along the outer edge. The lens 30 in FIG. 2 is shown in cross section to illustrate its construction and is subject to considerable varation depending upon the curvature of the curve through the loudspeakers, the frequency of the sound used in the apparatus, the shape of the focal surface and other factors.

What I claim as new and desire to secure by Letters Patent of the United States is:

1. In a sonar receiver an array of transducers arranged to receive wave forms from a variety of directions and to convert said wave forms to electrical signals, means for amplifying the electrical signals from each of said transducers, second transducer means arranged along a curved surface for converting said electrical signals to sound waves, said arrangement along a curved surface serving to focus said sound waves on another surface comprising a plurality of focal points, and means at each of said focal points for receiving said focused sound waves and converting them to usable electrical signals.

2. A sonar directional beam former comprising a plurality of transducers arrayed substantially in a plane to receive sound waves and convert them to electrical signals, a plurality of loudspeakers arrayed in a curve having a focal point, said focal point forming one focusing area in an array of individual focusing areas, said loudspeakers receiving said electrical signals and transmitting new sound waves proportional thereto, and a second plurality of transducers arrayed so that one transducer is located in each of said focusing areas to receive said new sound waves and convert them to useful signals.

3. A sonar directional beam former comprising a plurality of transducers arrayed to receive sound waves and convert them to electrical signals, a plurality of loudspeakers arrayed in a curve having a focal point, said focal point lying in a focal plane, said loudspeakers receiving said electrical signals and transmitting new sound waves proportional thereto, and a second plurality of transducers arrayed in said focal plane to receive said new sound waves and convert them to useful signals.

4. A sonar directional beam forming system comprising a first plurality of transducers arranged substantially in a plane for receiving a first wave front incident parallel to said plane and a second wave front incident at an acute angle to said plane, said transducers converting the energy represented by various parts of said wave fronts into individual portions of electrical energy, a second plurality of transducers arranged along a curved surface having a focal point, means coupling each of said second plurality of transducers to receive an individual portion of said electrical energy and convert said individual portions into elements of sound waves having curvilinear wave fronts tending to focus on a focusing surface passing through said focal point, a wave derived from said first wave front focusing on said focal point and a wave derived from said second wave front focusing on a different point on said focusing surface, where the space between said focal point and said different point is proportional to the acute angle of said second wave front and a third plurality of transducers located to receive waves focused on distinct focal points in said focal surface and to generate signals proportional to the energy content of said waves.

5. A sonar directional beam forming system comprising a first plurality of transducers arranged substantially in a plane for receiving a first wave front incident parallel to said plane and a second wave front incident at an acute angle to said plane, said transducers converting the energy represented by various parts of said wave fronts into individual portions of electrical energy, a second plurality of transducers arranged along a curved surface having a focal point, means coupling each of said second plurality of transducers to receive an individual portion of said electrical energy and convert said individual portions into elements of sound waves having curvilinear wave fronts tending to focus on a focal surface passing through said focal point, a wave derived from said first wave front focusing on said focal point and a wave derived from said second wave front focusing on a different point in said focal surface, where the space between said focal point and said different point is proportional to the acute angle of said second wave front and a third plurality of transducers located to receive waves focused on distinct focal points in said focal surface and to generate signals proportional to the energy content of said waves.

6. A sonar directional beam forming system substantially as claimed in claim 5, and including means for correcting for deterioration of image quality near the edges of focused images including a compound lens structure inserted between the second plurality of transducers and the focal surface.

7. A sonar directional beam forming system comprising a first plurality of transducers arranged substantially in a plane for receiving a first wave front incident parallel to said plane and a second wave front incident at an acute angle to said plane, said transducers converting the energy represented by various parts of said wave fronts into individual portions of electrical energy, a second plurality of transducers arranged along a curve having a focal point, means coupling each of said second plurality of transducers to receive an individual portion of said electrical energy and to convert said individual portions into elements of sound waves having curvilinear wave fronts tending to focus on a plane passing through said focal point, whereby a first sound wave generated from electrical signals originating from said first wave front incident to said plane is focused at said focal point and a second sound wave generated from electrical signals originating from said second wave front incident at an acute angle to said plane is focused at a point in said focal plane other than said focal point, a third array of transducers arrayed to receive sound waves focused on said focal plane, each transducer of said third array providing a signal proportional to the strength of the particular sound wave impinging upon it, and means for supplying each signal for further useage.

References Cited by the Examiner

UNITED STATES PATENTS

| | | | |
|---|---|---|---|
| 1,529,520 | 3/1925 | Watkins | 181—0.5 |
| 2,065,578 | 12/1936 | Glen | 181—0.5 |
| 2,453,502 | 11/1948 | Dimmick | 340—6 |
| 2,566,703 | 9/1951 | Iams | 343—100 |
| 2,898,589 | 8/1959 | Abbott | 340—6 |
| 2,922,483 | 1/1960 | Harris | 181—0.5 |
| 2,987,068 | 6/1961 | Branson | 340—3 |

OTHER REFERENCES

The International Dictionary of Physics and Electronics, D. Van Nostrand Co., Inc., 1956 (pp. 440 and 529 relied on).

CHESTER L. JUSTUS, *Primary Examiner.*

KATHLEEN CLAFFY, *Examiner.*